(12) United States Patent
Liesenberg

(10) Patent No.: US 7,289,622 B1
(45) Date of Patent: *Oct. 30, 2007

(54) METHOD AND APPARATUS FOR DATA TRANSPORT USING LABEL SWITCHING

(75) Inventor: Paul Liesenberg, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 11/371,260

(22) Filed: Mar. 7, 2006

Related U.S. Application Data

(63) Continuation of application No. 09/420,951, filed on Oct. 19, 1999, now Pat. No. 7,046,786.

(51) Int. Cl.
*H04M 7/00* (2006.01)
*H04M 11/00* (2006.01)
*H04L 12/66* (2006.01)

(52) U.S. Cl. ............... 379/220.14; 379/90.01; 370/352; 370/356

(58) Field of Classification Search ........... 379/201.04, 379/220.01, 221.01, 221.02, 221.14; 370/352, 370/356
See application file for complete search history.

(56) References Cited

U.S. PATENT DOCUMENTS

| | | | |
|---|---|---|---|
| 5,737,517 A | 4/1998 | Kite et al. | |
| 6,084,956 A | 7/2000 | Turner et al. | |
| 6,118,785 A | 9/2000 | Araujo et al. | |
| 6,205,135 B1 | 3/2001 | Chinni et al. | |
| 6,285,680 B1 | 9/2001 | Steinka et al. | |
| 6,292,478 B1 | 9/2001 | Farris | |
| 6,295,293 B1 | 9/2001 | Tonnby et al. | |
| 6,330,250 B1 | 12/2001 | Curry et al. | |
| 6,442,169 B1 | 8/2002 | Lewis | |
| 6,507,577 B1 | 1/2003 | Mauger et al. | |
| 6,512,768 B1 | 1/2003 | Thomas | |
| 6,633,563 B1 | 10/2003 | Lin et al. | |
| 7,046,786 B2 | 5/2006 | Liensenberg | |

OTHER PUBLICATIONS

VocalTec Telephony Gateway Calling Options, p. 2-3 (Jan. 27, 1997).
Internet Engineering Task Force (IETF), Request for Comments (RFC), 2105, "Cisco Systems," Tag Switching Architecture Overview, authored by Y. Rekhter, B. Davie, D. Katz, E. Rosen, and G. Swallow, http://www.ietf.org (Feb. 1997).
Internet Engineering Task Force (IETF), Request for Comments (RFC), 2430, "Cisco Systems," A Provider Architecture for Differentiated Services and Traffic Engineering (PASTE), authored by T. Li, Y. Rekhter, http://www.ietf.org (Oct. 1998).
Internet Engineering Task Force (IETF), Request for Comments (RFC), 2702 "Cisco Systems," Requirements for Traffic Engineering Over MPLS, authored by D. Awduche, J. Malcolm, J. Agogbua, M. O'Dell, J. McManus, http://www.ietf.org (Sep. 1999).
http://www.itu.int/search, ITU-T Telecommunication Standardization Sector of ITU, Q.2763, Broadband Integrated Services Digital Netowork (B-ISDN)-Signaling System No. 7 B-ISDN User Part (B-ISUP), Formats and Codes, pp. ii-v and 1-87 (Feb. 2005).

*Primary Examiner*—Bing Q. Bui
(74) *Attorney, Agent, or Firm*—Blakely, Sokoloff, Taylor & Zafman LLP

(57) ABSTRACT

A method including receiving a call connection request message having a prefix number and determining a corresponding IP address based on the prefix number. Then, assigning a label based on the corresponding IP address. Further, routing the call connection request message based on the label. An apparatus implementing the method described above.

29 Claims, 5 Drawing Sheets

METHOD AND APPARATUS FOR DATA TRANSPORT USING LABEL SWITCHING

CROSS REFERENCE TO RELATED APPLICATION

The present application claims priority from and is a continuation application of U.S. patent application Ser. No. 09/420,951 filed Oct. 19, 1999 now U.S. Pat. No. 7,046,786.

FIELD OF THE INVENTION

This invention relates to network infrastructures. Specifically, this invention is directed towards a method and apparatus for transporting data using label switching.

BACKGROUND

Proposals are frequently submitted to standardization bodies, or generally discussed among technology experts, that describe how to integrate, transport and consolidate traditional central office (CO) based voice services (e.g., plain old telephone services (POTS)) over next generation infrastructures such as Asynchronous Transfer Mode (ATM) infrastructure.

In the interim, standards bodies such as the International Telecommunications Union (ITU) have defined a series of standards that are often regarded as the way to achieve this integration. This infrastructure is known as the ATM-Broadband Integrated Services Digital Network (B-ISDN) infrastructure. However, this infrastructure could face scaling and voice quality issues as it simply represents an overlay solution with its inherent issues. For example, the current infrastructure is based on a circuit-based network, which is limited in its numbering and addressing capabilities.

In addition, this new infrastructure will ultimately be based on Internet Protocol (IP), or an evolutionary form of IP. Specifically, the service layer will be fully IP-based and the transport layer will either be IP or ATM. Thus, it would be desirable to have a technology to provide large-scale integration of voice traffic that works on both technologies seamlessly, and yet is able to deliver the connection-oriented nature and the quality of service guarantee that traditional voice service requires.

SUMMARY

It is therefore an object of the present invention to simplify signaling flows across the network.

It is a further object of the present invention to reduce the signaling burden on call processors within the core network.

It is yet a further object of the present invention to optimally take advantage of the new, emerging infrastructure, and elegantly combine IP, ATM and voice technologies—keeping their protocol stacks separate and intact, and eliminating the need for very extensive mapping of signaling aspects between the different technologies.

These and other objects of the invention are provided by a system that provides connectivity establishment based on the topology of the voice network, but not requiring the individual user initiated call requests to be individually established within the core network. The individual call requests are tunneled through the core network, and the call requests are only established within and among the edge voice central offices. In one embodiment, the process involves receiving a call connection request message having a prefix number. Then, determining a corresponding IP address based on the prefix number, and assigning a label based on the corresponding IP address. Further, routing the call connection request message based on the label.

Other objects, features, and advantages of the present invention will be apparent from the accompanying drawings and from the detailed description that follows below.

BRIEF DESCRIPTION OF THE DRAWINGS

The system is illustrated by way of example and not limitation in the figures of the accompanying drawings in which like references indicate similar elements and in which.

DETAILED DESCRIPTION

In order to support large scale voice architectures, a transport solution for large scale voice services based on tag switching and IP is proposed. In one embodiment, voice switches located in central offices (CO) implement the service at the edge node layer (e.g., the nodes that are at the edge of the network), surrounding the IP/ATM infrastructure. An IP "adjunct processor" (e.g., a router) extends the capability of the CO to allow the CO to (1) maintain an IP address and (2) communicate using a robust IP routing protocol. These CO's with the extended IP capability set are referred to as next generation central offices (ngCO's). All ngCO's in the network implement the multi-protocol label switching (MPLS) (also known as tag switching) protocol stack. MPLS is described in the Internet Engineering Task Force (IETF) Request For Comments (RFC) 2105, titled "Cisco Systems' Tag Switching Architecture Overview", authored by Y. Rekhter, B. Davie, D. Katz, E. Rosen, and G. Swallow, a copy of which is located at http://www.ietf.org.

ngCOs connect to the IP-ATM infrastructure, which is also tag-switching/MPLS-based, by using the tag switching/MPLS label distribution protocol and IP routing protocol (or, when available, next generation IP routing protocol). ngCO's exchange topology information and request connectivity (labels) to connect to other ngCO's. The connectivity is established using labels that identify permanent virtual paths (PVP's) with guaranteed quality of service (QoS) parameters. The ngCO's dynamically map voice connections onto these pre-established PVP's, and thus user calls are tunneled through the infrastructure. Many additional features that increase reliability such as overflow routing or intelligent network services may be defined using this model.

Figure 1:
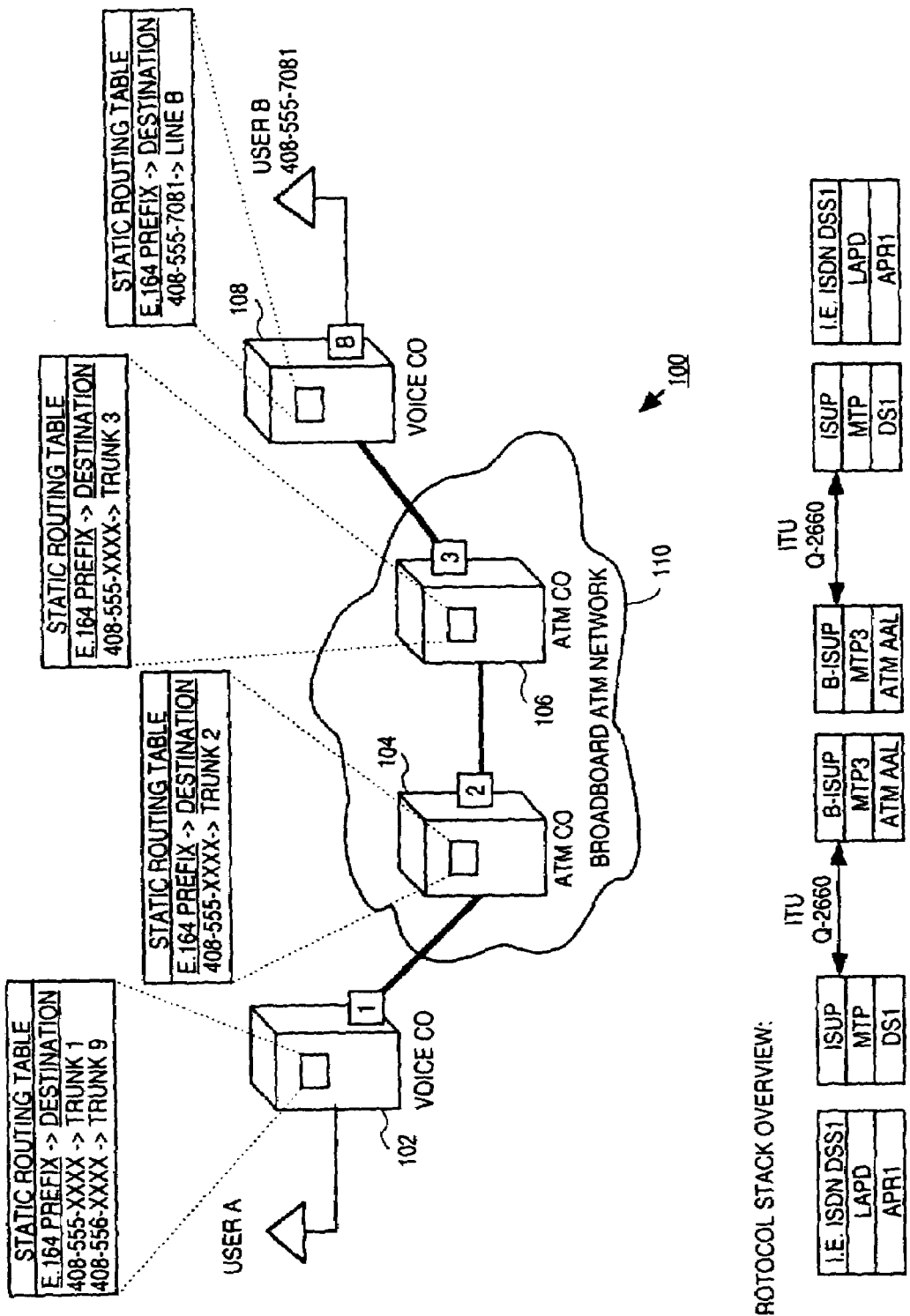
FIG. 1 is a block diagram of connectivity establishment over a prior art integrated services digital network.

FIG. 1 is a block diagram of connectivity establishment over a prior art integrated services digital network 100. Network 100 includes a first voice CO 102, a first ATM CO 104, a second ATM CO 106, and a second voice CO 108.

First voice CO 102 and second CO 108 are edge CO's responsible for transferring received ISDN calls to ATM CO's such as first ATM CO 104. The voice CO's maps a user's call into a Signal System 7 (SS7) initial address message (IAM) to attempt to establish a connection. A static routing table contained on the CO is used to determine the destination for the connection establishment attempt. CO's are connected through trunk lines, where multiple trunk lines may be used between each CO.

ATM CO 104 and ATM CO 106 are part of a broadband network 110. The ATM CO's performs ISDN User Part (ISUP) to broadband ISUP (B-ISUP) internetworking. The ISUP signaling protocol, as defined by the American National Standards Institute (ANSI), is an out-of-band signaling technique used for call set up and tear down over the SS7 network. ISUP transfers call set-up information between signaling points (SP) in an SS7 network. The ATM CO's uses ISUP to set up a virtual channel for each voice call.

In FIG. 1, a user A, which is coupled to voice CO 102, is trying to establish a voice call with a user B coupled to voice CO 108. User A sends a call request to voice CO 102, which maps the request to a SS7 IAM in order to attempt to establish a connection. As noted above, a static routing table is used to determine the destination for the attempted connection establishment. In the example illustrated by FIG. 1, where user B's phone number is 408-555-7081, voice CO 102 looks up the trunk line that should be used for routing the call request in a local routing table by using "408-555." In this example, the area code (e.g., "408") and the prefix (e.g., "555") is used to determine that trunk 1 is to be used to forward the call request. Thus, the call request is forwarded to ATM CO 104. ATM CO 104, based on its local routing table, forwards the call request on trunk 2 to ATM CO 106, and ATM CO 106 forwards the call request to voice CO 108 based on the same protocol. Voice CO 108 then determines that the call request should be forwarded to user B.

Figure 2:
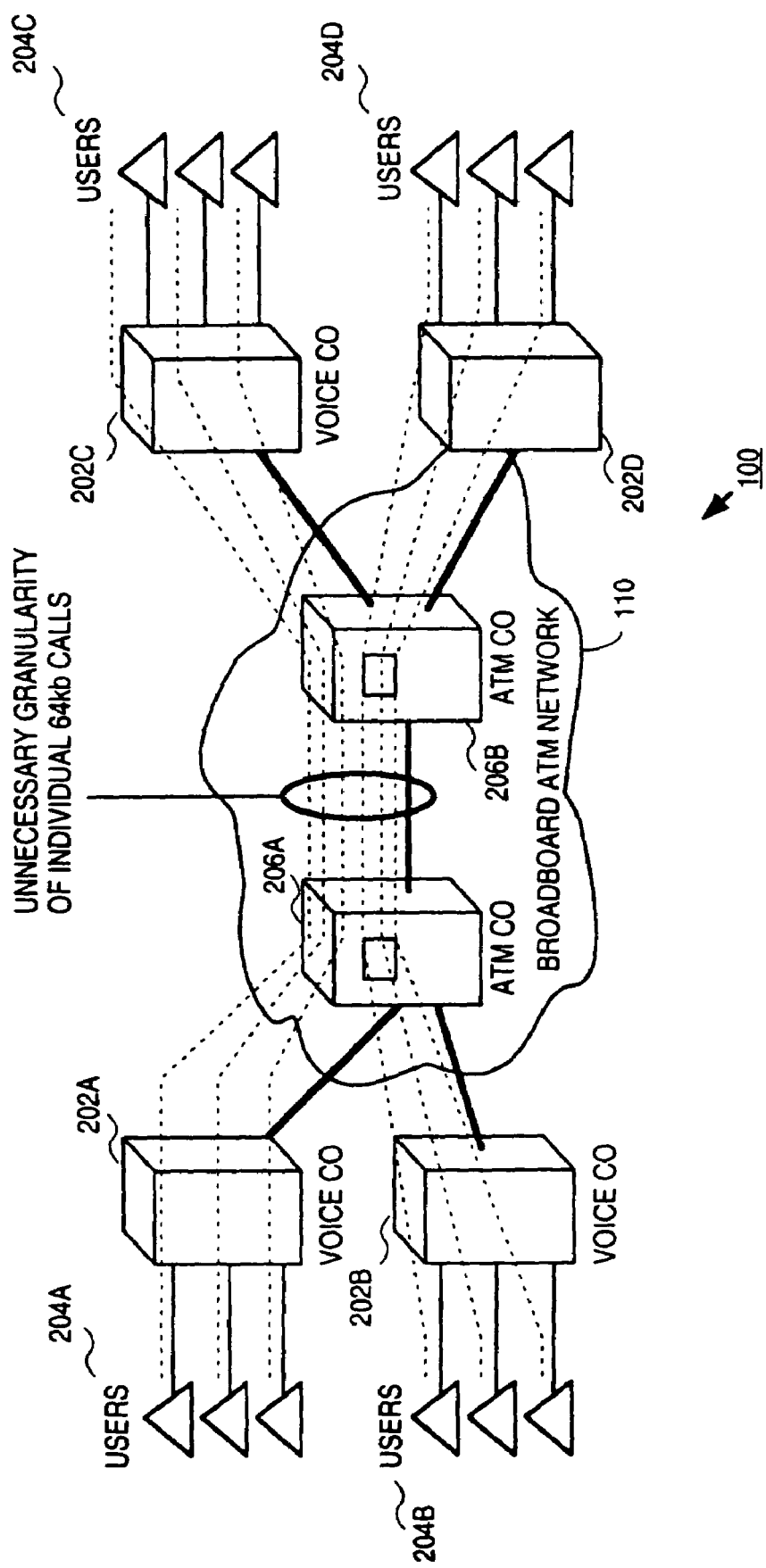
FIG. 2 is a block diagram of issues present with connectivity establishment in the prior art network of FIG. 1.

FIG. 2 is a block diagram of issues present with connectivity establishment in network 100 of FIG. 1. Network 100 contains a set of voice CO's 202a–202d similar to voice CO 102 and voice CO 108. Each one of set of voice CO's 202a–202d services a set of users 204a–204d, respectively. Set of voice CO's 202a–202d are also connected to broadband network 110, containing a set of ATM CO's 206a–206b. As shown in FIG. 2, each user requires a single link through network 100, and each link is individually mapped from point-to-point (e.g., each link is individually mapped from one user to another user).

The individual mapping creates several issues, including concentration of connection setup requests in the broadband infrastructure (e.g., broadband network 110), administrative lack of transparency, required visibility of very small 64 kbit/s channels when compared to the multi-gigabit/s broadband network channels, and lack of transparency in routing topology. Moreover, one to one mapping requires that each 64 kbit/s channel to be individually handled to the segmentation and reassembly layer during processing, which increases the end-to-end delay penalty, and making echo compensation an issue.

Figure 3:
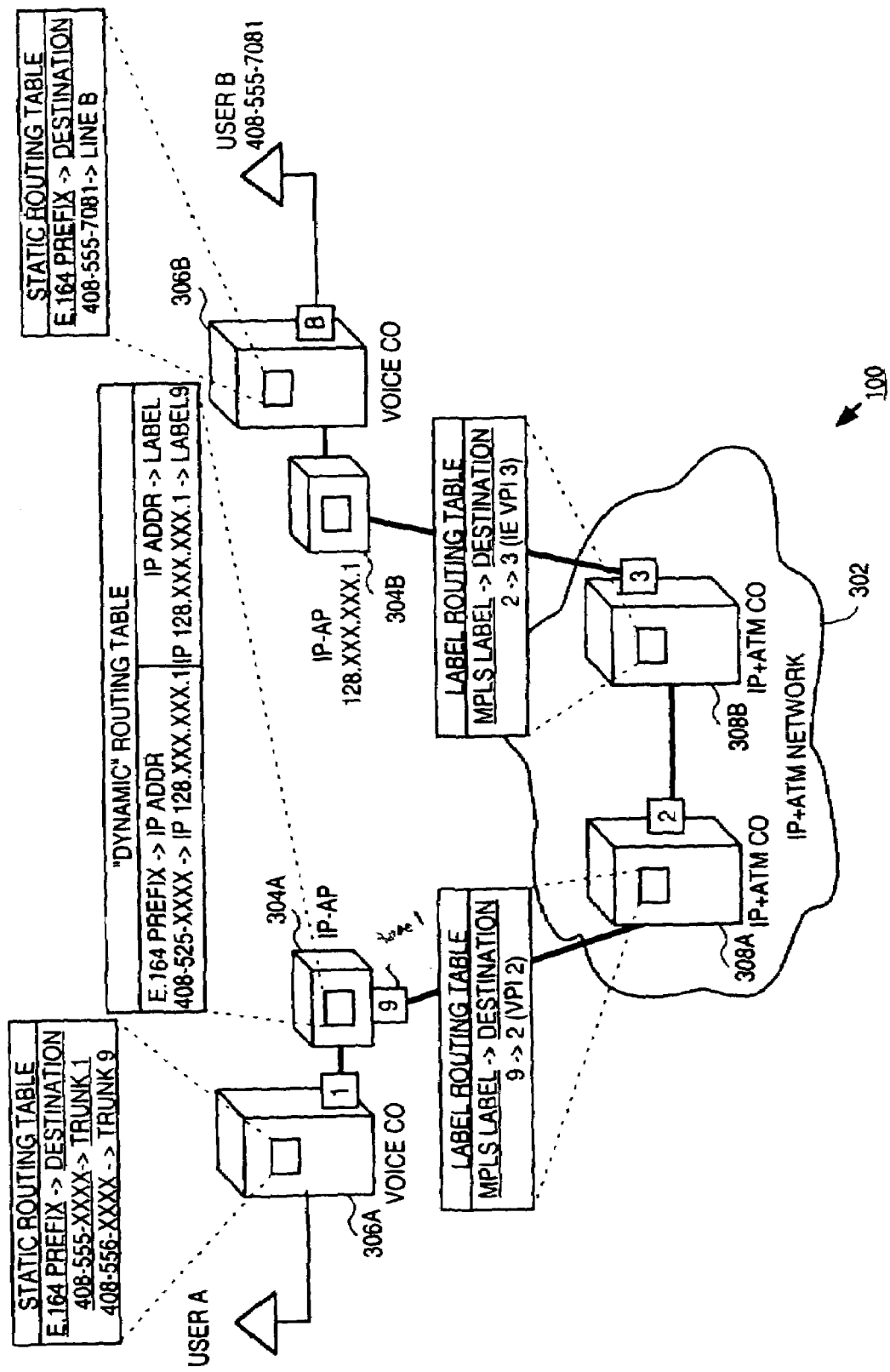
FIG. 3 is a block diagram of a network infrastructure configured in accordance with one embodiment of the present invention.

FIG. 3 illustrates network 100 including a set of IP-adjunct processors (IP-AP) 306a–306b connected to a set of voice CO's 304a–304b. Each IP-AP in set of IP-AP's 306a–306b has an associated IP address and communicates with devices in an IP+ATM network 302 using the IP routing protocol.

Set of IP-AP's 306a–306b tunnel the initial address messages using pre-established labels such that 64 kbits/s connections may be tunneled through IP+ATM network 302. The 64 kbits/s connections would be converted into packetized data and may be packed along with other packetized data from other 64 kbit/s connections into ATM cells for transfer. Once the 64 kbits/s connections have been packed into cells, the IP+ATM CO's in IP+ATM network 302 simply has to handle them using standard MPLS. Connections would be established using voice network topology messages.

For example, in FIG. 3, user A is attempting to establish a connection with user B, who has a phone number of 408-555-7081. A call request is sent to voice CO 306a, which uses its internal static routing table to determine that call requests to the prefix of "408-555" should be sent over trunk 1. Trunk 1 reaches IP-AP 304a, which from the prefix of "408-555" determines through a dynamic routing table that this call request would be handled by a device with an IP address of 128.56.43.87. Using the routing table, IP-AP 304 also determines that the call request should be sent over logical link labeled link 9, which is to IP+ATM CO 308a.

Once IP+ATM CO 308a receives the data, it determines that the call request should be sent over link 2. The determination is made using a local label routing table containing a list of MPLS labels with their corresponding destination links. Thus, once the call request is converted into the label switched network, the call request may be treated as other data in IP+ATM network 302, such that the data is packaged into cells and allows for routing based on the standards used in IP+ATM network 302. IP+ATM CO 308b then receives the call request and forwards the request to IP-AP 304b, which forwards the request to voice CO 306b. Voice CO 306b then uses a local static routing table to determine the call request should go to line B, associated with user B.

Before IP-AP 304b may be reached, it must broadcast its IP address, along with the associated prefixes that its associated voice CO (e.g., voice CO 306b) supports, before the system can begin to route calls to IP-AP 304b and voice CO 306b. In one embodiment, the numbers of which the prefix is a part of are based on the ITU standards on numbering and addressing (ITU standard E.164). The E.164 standard specifies a phone number in a country code and a national significance number (CC+NSN) format. The NSN format is left to the national body to further define and thus may be different for country to country. In one embodiment, a fixed portion of the NSN is chosen to be the prefix number.

Figure 4:
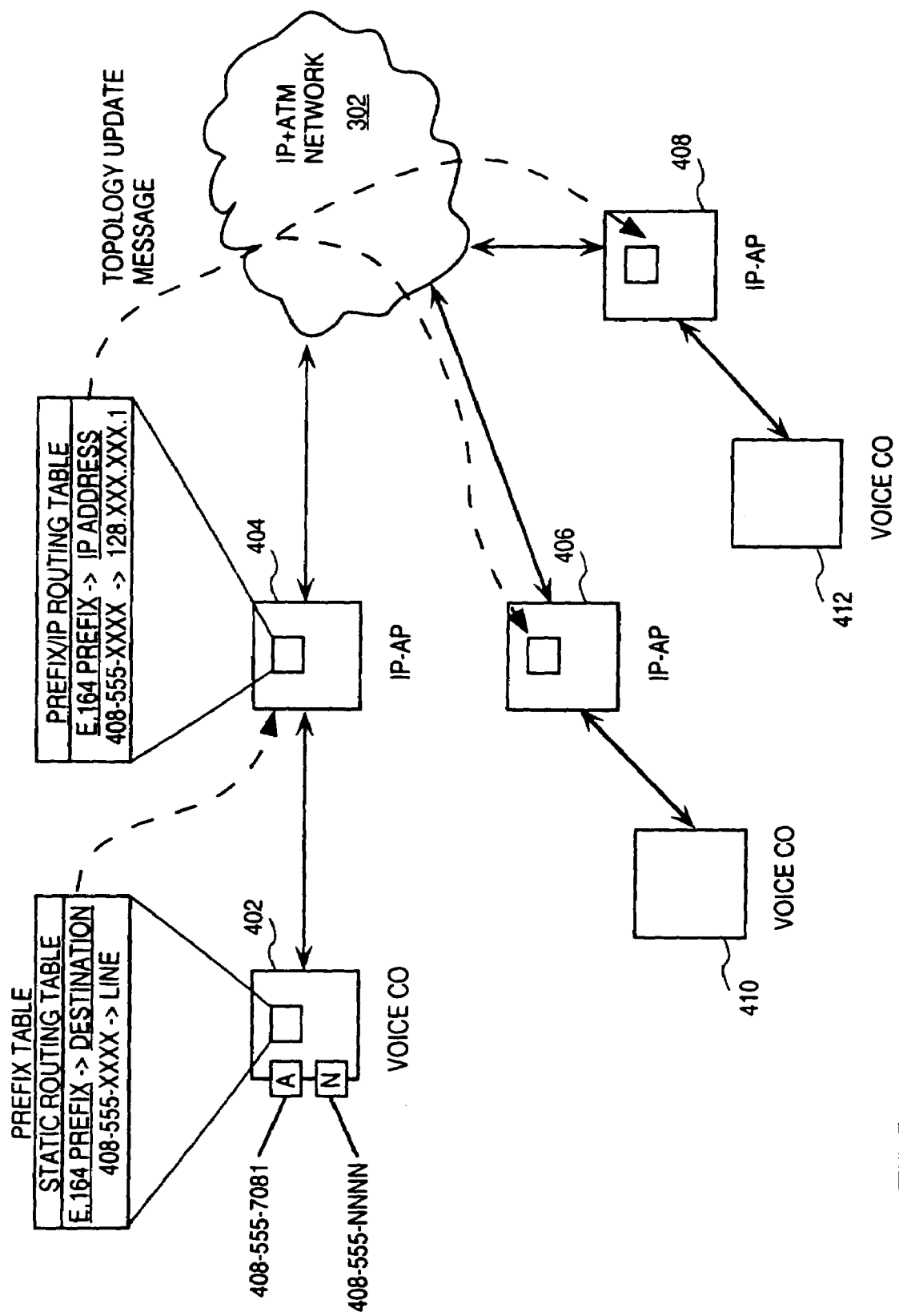
FIG. 4 is a diagram illustrating an MPLS connection establishment for a voice infrastructure configured in accordance to one embodiment of the present invention.
Figure 5:
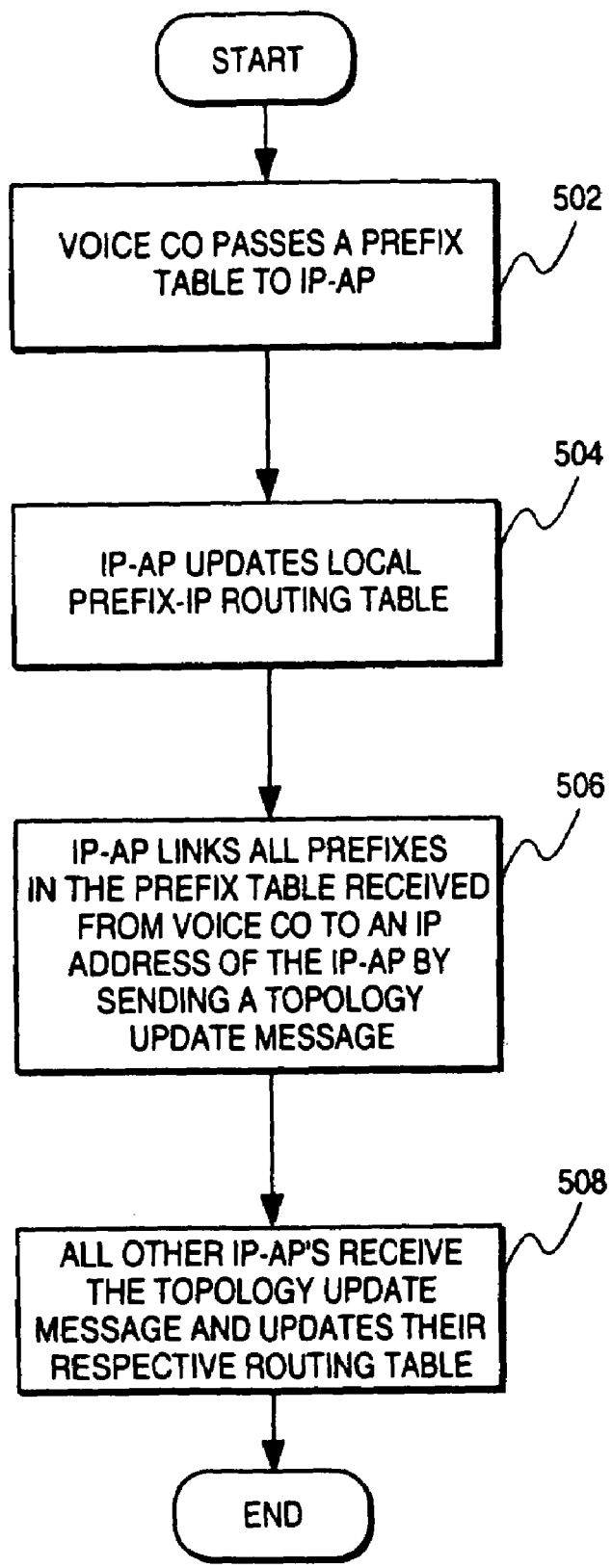
FIG. 5 is a flow diagram for an MPLS connection establishment procedure according to one embodiment of the present invention.

FIG. 4 and FIG. 5 illustrate the set-up process for voice CO 306a and IP-AP 304a. In FIG. 4, is a simplified diagram of FIG. 3, and voice CO 306a is represented by a voice CO 402. Similarly, IP-AP 304a is abstracted by an IP-AP 404. The first step in the process, in block 502, is for voice CO 402 to pass a prefix table to IP-AP 404. The prefix table lists the prefixes voice CO 402 supports (e.g. "408-555") and the associated phone lines attached to voice CO 402 (e.g., "A"–"n"). Voice CO 402 may support many hundreds of thousands of users (e.g., phone lines) and thus support multiple prefixes. For example, voice CO 402 may also support prefix "408-556").

After voice CO 402 has transferred its prefix table to IP-AP 404 in block 502, IP-AP 404 updates its local prefix-IP routing table (which was also referred to as the dynamic routing table in the description accompanying FIG. 3) in block 504. Then, in block 506, IP-AP 404 "links" all prefixes in the prefix table received from voice CO 404 to an IP address of IP-AP 402 by broadcasting the IP address and the prefixes from the prefix table in an update message. For example, the update message is sent to IP-AP 406, which services voice CO 410, and also sent to IP-AP 408, which services voice CO 412. Thus, all other IP-AP's in the network are updated via topology update messages, which allow each IP-AP to update local routing tables to include the topology update information in block 508, thus establishing connectivity to prefix and use.

The IP-AP for voice CO switches extends the capabilities of existing voice CO switches and allows these voice CO switches to communicate using IP routing protocols. These adjunct processors implement broadband IP or ATM interfaces to the core network. As core infrastructure switches only have to implement tag switching/MPLS, no major architectural changes are required. It is crucial, though, that quality of service guarantees required by the voice service (predictable low delay) are very strictly supported, and fully isolated from other service categories in the network. It is noted that the functionality provided by each IPAP may be integrated into each voice CO switch, and thereby reducing the need to service a separate component from voice CO switch.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method performed at a first edge node of a digital network, comprising:
   receiving a telephony call connection request message that has a prefix number;
   determining an IP address of a second edge node based on the prefix number;
   converting the telephony call connection request message into a connection request data having a label; and
   sending the connection request data to the second edge node over a logical link defined by the label.

2. The method of claim 1, wherein the label identifies one or more permanent virtual paths (PVPs) within the digital network with guaranteed quality of service (QoS) parameters.

3. The method of claim 1, wherein the sending the connection request data to the second edge node is in compliance with a multi-protocol label switching (MPLS) protocol.

4. The method of claim 1, further comprising
   receiving a message containing the IP address of the second edge node and one or more prefix numbers associated to the IP address of the second edge node.

5. The method of claim 1, where the prefix number is in a format conforming to ITU E.164, representing a set of numbers having a country code portion and a national significance portion.

6. A method performed at a core network of a digital network, comprising:
   receiving connection request data having a label;
   receiving other data from one or more other established connections, wherein the other data have the label;
   tunneling the connection request data along with the other data from the one or more other established connections by routing the connection request data with the other data based on the label.

7. The method of claim 6, wherein the label identifies one or more permanent virtual paths (PVPs) within the digital network with guaranteed quality of service (QoS) parameters.

8. The method of claim 6, wherein the tunneling is performed in compliance with a multi-protocol label switching (MPLS) protocol.

9. The method of claim 6, further comprising
   transferring a message containing the IP address and one or more prefix numbers associated to the IP address, the IP address being assigned to the edge node that handles calls for the one or more prefix numbers.

10. A digital network, comprising:
    a first edge node,
    a second edge node; and
    a core network coupled to the first edge node and the second edge node, wherein the first edge node is to receive a telephony call connection request message that has a prefix number, determine an IP address of a second edge node based on the prefix number, convert the telephony call connection request message having a prefix number into a connection request data having a label, and to send the connection request data through the core network to the second edge node over a logical link defined by the label.

11. The network of claim 10, wherein the label identifies one or more permanent virtual paths (PVPs) within the digital network with guaranteed quality of service (QoS) parameters.

12. The network of claim 10, wherein the first edge node is to send the connection request data to the second edge node in compliance with a multi-protocol label switching (MPLS) protocol.

13. The network of claim 10, wherein the first edge node is further to receive a message containing the IP address of the second edge node and one or more prefix numbers associated to the IP address of the second edge node.

14. An apparatus, comprising:
    means for receiving a telephony call connection request message that has a prefix number;
    means for determining an IP address based on the prefix number;
    means for converting the telephony call connection request message into a connection request data having a label; and
    means for sending the connection request data over a logical link defined by the label.

15. The apparatus of claim 14, wherein the label identifies one or more permanent virtual paths (PVPs) within the digital network with guaranteed quality of service (QoS) parameters.

16. The apparatus of claim 14, wherein the sending the connection request data is performed in compliance with a multi-protocol label switching (MPLS) protocol.

17. The apparatus of claim 14, further comprising
    means for receiving a message containing the IP address an edge node and one or more prefix numbers associated to the IP address of the edge node.

18. An apparatus, comprising:
    means for receiving connection request data having a label;
    means for receiving other data from one or more other established connections, wherein the other data have the label;
    means for tunneling the connection request data along with the other data from the one or more other established connections by routing the connection request data with the other data based on the label.

19. The apparatus of claim 18, wherein the label identifies one or more permanent virtual paths (PVPs) within the digital network with guaranteed quality of service (QoS) parameters.

20. The apparatus of claim 18, wherein the tunneling is performed in compliance with a multi-protocol label switching (MPLS) protocol.

21. The apparatus of claim 18, further comprising means for transferring a message containing the IP address and one or more prefix numbers associated to the IP address, the IP address being assigned to an edge node that handles calls for the one or more prefix numbers.

22. A machine-readable medium that provides executable instructions, which when executed by a machine, cause the machine to perform operations, comprising:

receiving a telephony call connection request message that has a prefix number;

determining an IP address based on the prefix number;

converting the telephony call connection request message into a connection request data having a label; and sending the connection request data to an edge node over a logical link defined by the label.

23. The machine-readable medium of claim 22, wherein the label identifies one or more permanent virtual paths (PVPs) within the digital network with guaranteed quality of service (QoS) parameters.

24. The machine-readable medium of claim 22, wherein the sending the connection request data to the edge node is in compliance with a multi-protocol label switching (MPLS) protocol.

25. The machine-readable medium of claim 22, further including data that cause the machine to perform operations comprising receiving a message containing the IP address of an edge node and one or more prefix numbers associated to the IP address of the edge node.

26. A machine-readable medium that provides executable instructions, which when executed by a machine, cause the machine to perform operations, comprising:

receiving connection request data having a label;

receiving other data from one or more other established connections, wherein the other data have the label;

tunneling the connection request data along with the other data from the one or more other established connections by routing the connection request data with the other data based on the label.

27. The machine-readable medium of claim 26, wherein the label identifies one or more permanent virtual paths (PVPs) within the digital network with guaranteed quality of service (QoS) parameters.

28. The machine-readable medium of claim 26, wherein the tunneling is performed in compliance with a multi-protocol label switching (MPLS) protocol.

29. The machine-readable medium of claim 26, further including data that cause the machine to perform operations comprising transferring a message containing the IP address and one or more prefix numbers associated to the IP address, the IP address being assigned to an edge node that handles calls for the one or more prefix numbers.

* * * * *